(12) United States Patent
Ho

(10) Patent No.: US 9,807,141 B1
(45) Date of Patent: *Oct. 31, 2017

(54) PLAYING OF MEDIA CONTENT AMONG MULTIPLE DEVICES USING A TEMPORAL PROGRESS

(71) Applicant: TP Lab, Inc., Palo Alto, CA (US)

(72) Inventor: Chi Fai Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,980

(22) Filed: Jul. 23, 2016

Related U.S. Application Data

(63) Continuation of application No. 14/099,642, filed on Dec. 6, 2013, now Pat. No. 9,432,429.

(51) Int. Cl.
*G06F 15/16* (2006.01)
*H04L 29/06* (2006.01)
*H04N 21/2387* (2011.01)

(52) U.S. Cl.
CPC ....... *H04L 65/604* (2013.01); *H04N 21/2387* (2013.01)

(58) Field of Classification Search
CPC .................. H04L 67/104; H04L 65/4015
See application file for complete search history.

(56) References Cited

U.S. PATENT DOCUMENTS

| | | | | |
|---|---|---|---|---|
| 2008/0209021 A1* | 8/2008 | Shamma | ............ | H04L 65/4015 709/223 |
| 2011/0219413 A1* | 9/2011 | Krikorian | ............ | G11B 27/034 725/109 |
| 2012/0030366 A1* | 2/2012 | Collart | ............ | G06F 17/30017 709/229 |
| 2013/0218942 A1* | 8/2013 | Willis | ............ | H04L 67/02 709/201 |
| 2013/0346478 A1* | 12/2013 | Rodriguez | ............ | H04L 65/60 709/203 |
| 2014/0029913 A1* | 1/2014 | Lopez | ............ | H04N 21/42208 386/230 |
| 2015/0074700 A1* | 3/2015 | Danovitz | ............ | H04N 21/4826 725/14 |

* cited by examiner

*Primary Examiner* — Frantz Jean
(74) *Attorney, Agent, or Firm* — North Shore Patents, P.C.; Michael Liu Baillie

(57) ABSTRACT

In a playing of media content among multiple devices, a first device creates a first progress information associated with a media content and the first device. The first progress information includes a current progress in a playing of the media content by the first device. When a second device receives an instruction to play the media content, the second device obtains the first progress information from the first device, creates a second progress information associated with the media content and the second device based on the first progress information, fetches the media content based on the second progress information, and plays the media content using the second progress information. In this manner, a progress in playing the media content is tied to the device playing the media content, and this progress may be shared with another device in the playing of the media content on the other device.

24 Claims, 6 Drawing Sheets

Step 311: User 100 instructs device 110 to play content 410

Step 313: Device 110 creates progress information 151

Step 315: Device 110 pauses or stops playing content 410

Step 321: User 100 instructs device 120 to play content 410

Step 323: Device 120 obtains progress information 151 from device 110

Step 324: Device 120 determines validity of progress information 151

Step 325: Device 120 creates progress 152 based on progress information 151

Step 327: Device 120 fetches content 410 based on progress information 152

Step 328: Device 120 plays content 410 using progress information 152

Step 329: Device 120 updates progress information 152

Figure 3

PLAYING OF MEDIA CONTENT AMONG MULTIPLE DEVICES USING A TEMPORAL PROGRESS

CROSS-REFERENCE TO RELATED APPLICATIONS

This application is a continuation of U.S. patent application Ser. No. 14/099,642, filed on Dec. 6, 2013, and issued as U.S. Pat. No. 9,432,429 on Aug. 30, 2016.

BACKGROUND OF THE INVENTION

Field

This invention relates generally to media, and more specifically, to a method to play content among multiple devices.

Related Art

Consuming digital media content such as an electronic book, a digital video, an on-line video, or a digital document is becoming easier. A user can watch a television show through Netflix® on her networked television set, her laptop, her tablet or her smartphone. The user can do so any time anywhere, and as many times as she desires. Another user can read a book on his Kindle e-reader, and later continues the reading on a Kindle tablet, or a Kindle e-reader software running on his Android™ phone.

Even when a user finds convenience to consume or play a digital content on multiple devices, the experience is not as desired. Mary finished reading the e-book Hunger Game volume 1 last year on her Kindle®. Her younger sister, Liz, becomes interested in the book and wants to read it. Liz received a Kindle Fire as a gift from her father last week. She logs into the family Kindle account and finds the e-book. When Liz loads and opens the e-book. Kindle Fire opens the book at the last page of the book, where Mary last read the book a year ago. Liz has to flip back to the beginning of the book.

John and Susan have a family subscription to an online video service. They both like the TV series Breaking Bad. John watched episode 5 last night on his tablet and stopped at about 15 minute into the video. Susan turned on their television in the morning and watched the same episode. She found the video was played starting midway. She realized John must have watched part of it earlier. She rewound to the beginning of the video and finished watching the video. During lunch time, John wants to continue watching. He turns on his iPhone® and starts the video. To his surprise, the video does not resume from where he left off. The video application indicates the video has reached the end and needs to start playing from the beginning. John forgets where he stopped last night and is irritated that he has to start all over again.

Maryann reads an online newspaper every day. Now she bought a second tablet to be used in her bedroom, she would resume reading some news articles she started earlier that morning on her older tablet, before turning off the light for the night. In the morning, when she turns on the older tablet, she finds it odd when the online newspaper starts on the news article she did not complete the day earlier. She expected the online newspaper to start with today's news.

The above scenarios illustrate the need for improved playing of media content over multiple devices. The timeliness of the content and which devices are used are important aspects of the user experience.

BRIEF SUMMARY OF THE INVENTION

According to one embodiment of the present invention, in a method for playing of media content among multiple devices, a second device receives an instruction to play the media content on the second device. In response to receiving the instruction, the second device obtains a first progress information associated with a first device, the first progress information including a current progress in a playing of the media content by the first device. The second device creates a second progress information associated with the media content and the second device based on the first progress information, fetches the media content based on the second progress information, and plays the media content by the second device using the second progress information.

In one aspect of the present invention, the method further includes the second device storing a current progress in the playing of the media content by the second device in the second progress information.

In one aspect of the present invention, the method further includes: playing the media content by the first device using the first progress information and playing the media content by the second device using the second progress information; updating, by the first device, the first progress information based on the playing of the media content by the first device; and updating, by the second device, the second progress information based on the playing of the media content by the second device.

In one aspect of the present invention, the second device further: determines whether the first progress information is valid, and upon determining that the first progress information is valid, creating the second progress information.

In one aspect of the present invention, the first progress information comprises an expiration condition. The second device further: determines whether the expiration condition is met; and upon determining that the expiration condition is not met, creates the second progress information.

In one aspect of the present invention, the first progress information comprises a location of the media content to which the first device has played the media content. The second device plays the media content based on the location in the first progress information.

In one aspect of the present invention, the second device resumes the playing of the media content from the location in the first progress information, from before the location in the first progress information, or from a beginning of the media content.

In one aspect of the present invention, the first progress information includes media server information for a media server. The second device determines that another media server services the media content, creates the second progress information to comprise information for the other media server, and fetches the media content from the other media server.

In one aspect of the present invention, the first device discovers the second device, and in response, sends the first progress information to the second device.

In one aspect of the present invention, the second device discovers the first device, and in response, sends a request for the first progress information associated with the media content to the first device. The second device receives the first progress information from the first device.

In one aspect of the present invention, the first device plays the media content for a user. The second device further determines that the user does not have an account on the second device and sends an invitation to the user to create the account on the second device.

System and computer readable medium corresponding to the above-summarized methods are also described and claimed herein.

BRIEF DESCRIPTION OF THE SEVERAL VIEWS OF THE FIGURES

FIG. 3 illustrates the playing of content using multiple devices according to embodiments of the present invention.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
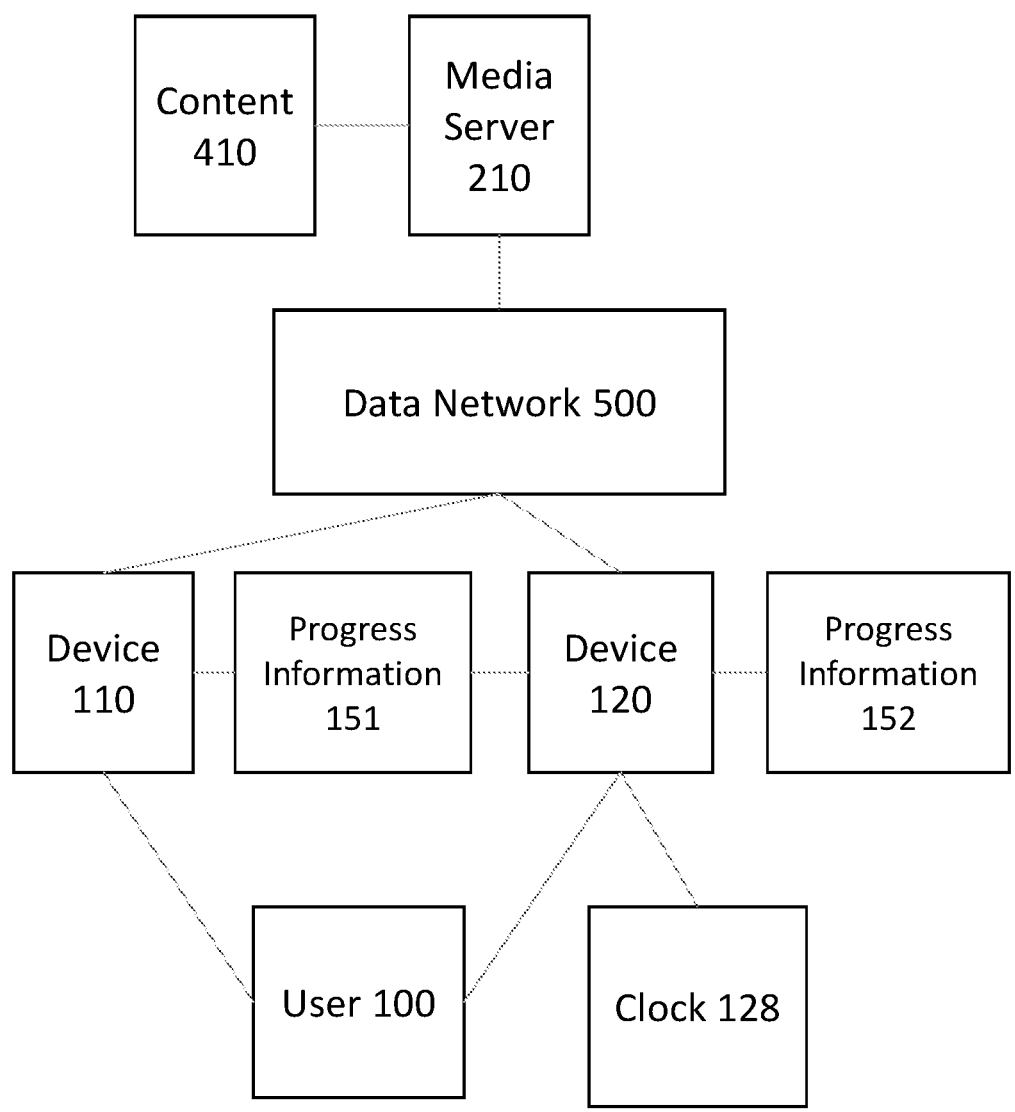
FIG. 1 illustrates a user playing a piece of media content using multiple devices according to embodiments of the present invention.

FIG. 1 illustrates a user consuming a piece of media content using multiple devices according to embodiments of the present invention.

User 100 uses a plurality of devices, such as device 110 and device 120, to consume or play content 410. In one embodiment, content 410 is an electronic content, a company document, a spreadsheet, a presentation, an image, an animation, an electronic book or an e-book, an electronic magazine, a piece of digital music, a video, a music program composing of a number of music pieces, a radio program, a television show, an electronic newspaper article, a piece of news, or a piece of digitized media content. In one embodiment, content 410 includes a collection of contents. In one embodiment, device 110 and device 120 fetch content 410 over data network 500 from media server 210 which provides access to content 410.

Figure 2A:
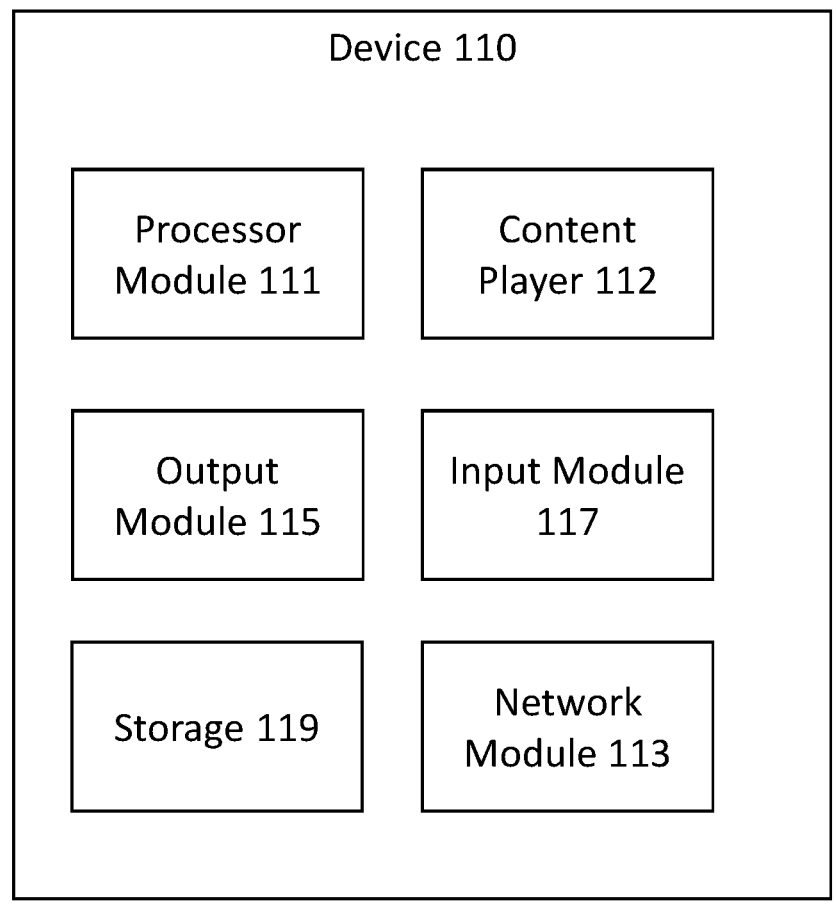
FIG. 2a illustrates a user device according to embodiments of the present invention.

In one embodiment, device 110, as illustrated in FIG. 2a, includes a processor module 111, an output module 115, an input module 117, storage 119 and a network module 113. In one embodiment, processor module 111 includes one or more general processors, a multi-core processor, an application specific integrated circuit based processor, a system on a chip (SOC) processor, or an embedded processor. In one embodiment, output module 115 includes a display for displaying images and text, an audio speaker, an image projector, or other forms of computer output. In one embodiment, input module 117 includes a physical or logical keyboard, buttons, keys, microphones, sensors such as optical sensor, infrared (IR) sensor, camera sensor, motion sensor, direction sensor, location sensor, any sensor that is usable for a user to provide input to device 110. In one embodiment, storage 119 includes a main memory, a hard disk drive (HDD), a solid state drive (SSD), a memory card, a ROM module, a RAM module, a USB disk or other storage component. In one embodiment, a network module 113 includes hardware and software to connect to a network such as Ethernet, a wired network, a wireless network, a cellular network, a mobile network, a Bluetooth network, a NFC network, or a WiFi network. Storage 119 includes executable instructions when executed by the processing module 111 of device 110 to implement one or more functionalities of the current invention. In one embodiment, device 110 includes a content player 112, which includes one or more computer programming instructions. In one embodiment, content player 112 is stored in storage 119.

In one embodiment, device 110 may be integrated into a smartphone, a tablet, a PC, a desktop computer, a mobile device, an e-reader, a game console, a television set, a digital picture frame, a smart camera, a smart watch, a medical device, a radio, an automobile, a toy, a consumer electronic device, a set top box, or a business machine.

In one embodiment, device 120 includes components similar to the components in device 110.

Figure 2B:
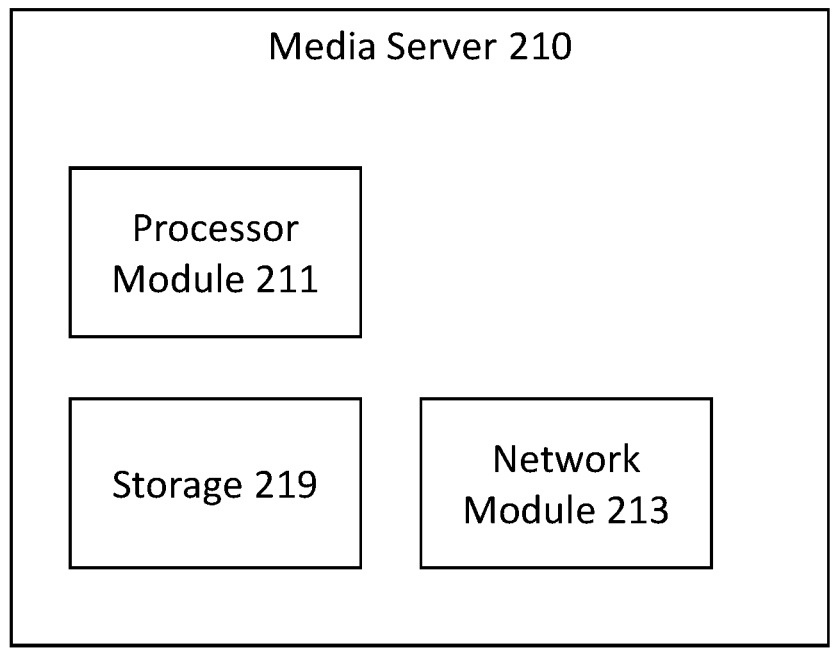
FIG. 2b illustrates a media server according to embodiments of the present invention.

In one embodiment, media server 210, as illustrated in FIG. 2b, includes a processor module 211, storage 219 and a network module 213. In one embodiment, processor module 211 includes one or more general processors, a multi-core processor, an application specific integrated circuit based processor, a system on a chip (SOC) processor, or an embedded processor. In one embodiment, storage 219 includes a main memory, a hard disk drive (HDD), a solid state drive (SSD), a memory card, a ROM module, a RAM module, a USB disk or other storage component. In one embodiment, a network module 213 includes hardware and software to connect to a network such as Ethernet, a wireless network, a cellular network, a mobile network, a Bluetooth network, or a WiFi network. Storage 219 includes executable instructions when executed by the processing module 211 of media server 210 implement one or more functionalities of the current invention.

In one embodiment, media server 210 includes one or more media servers. In one embodiment, media server 210 manages a subscription for user 100 wherein the subscription includes access to content 410. In one embodiment, media server 210 manages a subscription for device 110 and/or another subscription for device 120. In one embodiment, user 100 represents a person, one or more persons in a group, a family, an organization, a corporation, or an association. In one embodiment, user 100 represents a person with one or more identities. In one embodiment, user 100 represents a computing device operating device 110 and/or device 120.

FIG. 3 illustrates steps performed by various parts referenced in FIG. 1 according to embodiments of the present invention. In step 311, device 110 plays content 410 as instructed by user 100. In one embodiment, content player 112 of device 110 plays content 410. Content player 112 obtains content 410 through media server 210 over data network 500.

In step 313, device 110 creates progress information 151 to indicate a current state or progress of content player 112 regarding the action of playing content 410. In one embodiment, content player 112 creates progress information 151. In one embodiment, user 100 instructs content player 112 to create progress information 151. In one embodiment, content player 112 updates progress information 151 from time to time whenever there is a change of the progress of playing content 410. In one embodiment, device 110 stores progress information 151 in storage 119. In one embodiment, device 110 stores progress information 151 by sending progress information 151 to media server 210 where media sever 210 stores progress information 151 in storage 219 of media server 210.

In step 321, user 100 uses device 120 to play content 410. In one embodiment, user 100 instructs device 110 to stop or pause the playing of content 410 prior to using device 120, as illustrated in step 315. In one embodiment, device 110 continues to play content 410 while user 100 instructs device 120 to play content 410.

In step 323, device 120 obtains progress information 151 from device 110. In one embodiment, user 100 instructs device 120 to obtain progress information 151 from device 110. In one embodiment, user 100 instructs device 110 to send progress information 151 to device 120. In one embodiment, device 110 determines that device 120 is within communications distance through known discovery mechanism and asks if user 100 wants to send progress information 151 to device 120. In one embodiment, device 110 presents the discovery of device 120 on an output module of device 110. User 100 selects device 120 by interfacing with the input module 117 of device 110 and instructs device 110 to send progress information 151 to device 120. In one embodiment, device 110 is pre-configured to send progress information 151 to device 120. Once device 120 is discovered, device 110 automatically sends progress information 151 to device 120 without requiring user inputted instructions to do so.

In one embodiment, device 120 determines that device 110 is within communications distance through known discovery mechanisms and asks if user 100 wants to obtain progress information 151 from device 110. In one embodiment, device 120 presents the discovery of device 110 on an output module of device 120. User 100 selects device 110 by interfacing with the input module 117 of device 120 and instructs device 120 to obtain progress information 151 from device 110. In one embodiment, device 120 is pre-configured to obtain progress information 151 from device 110. Once device 120 discovers device 110, device 120 automatically obtains progress information 151 from device 110 without requiring user inputted instructions to do so.

In one embodiment, device 110 and device 120 communicate over data network 500. Device 110 discovers device 120 through data network 500. In one embodiment, device 110 discovers device 120 by sending a discovery message (not shown) to data network 500. In one embodiment, device 120 responds to the discovery message and device 110 discovers device 120 from the response message (not shown). In one embodiment, device 120 sends another discovery message (not shown) to data network 500. Device 110 receives the discovery message from device 120 and discovers device 120. In one embodiment, device 110 consults with a network computer over data network 500 to discover device 120. In one embodiment, device 110 is pre-configured with knowledge of device 120. In one embodiment, device 110 discovers device 120 by querying media server 210.

In other embodiments, device 120 discovers device 110 in the manners set forth above.

In step 324, device 120 determines if progress information 151 is valid. In one embodiment, device 120 includes clock 128 and compares clock 128 with progress information 151 to determine if progress information 151 is valid, as explained further below with reference to FIGS. 4-6.

In step 325, device 120 creates progress information 152 based on progress information 151. In one embodiment, user 100 instructs device 120 to create progress information 152. Device 120 creates progress information 152 using data in progress information 151. In one embodiment, device 120 automatically creates progress information 152 before or after receiving progress information 151. In one embodiment, device 120 receives progress information 151 after creating progress information 152, device 120 updates progress information 152 with data in progress information 151. In one embodiment, progress information 152 is updated to integrate progress information 151 into progress information 152. For example, assume that user 100 first plays content 410 on device 120, then plays content 410 on device 110, and then plays content 410 again on device 120. Device 120 would have an earlier-created progress information 152 and thus now updates progress information 152 by combining progress information 152 and progress information 151.

In step 327, device 120 obtains content 410 based on progress information 152. In one embodiment, using progress information 152, device 120 obtains information about media server 210 and content 410. Device 120 sends a request to media server 210 to obtain content 410, and in response, receives content 410 from media server 210. In one embodiment, device 120 obtains information about content 410 using progress information 152 and determines whether media server 210 or another media server serves content 410. Subsequently, device 120 obtains content 410 from the determined media server.

In step 328, device 120 plays content 410 for user 100, using progress information 152. In one embodiment, device 110 stops playing content 410 for user 100 at a certain location of content 410. Device 120 resumes playing content 410 from device 110's stopped location of content 410. In one embodiment, device 120 determines it should play content 410 from the beginning of content 410. In one embodiment, device 120 determines progress information 152 or progress information 151 is invalid and determines that content 410 is not to be played.

In step 329, device 120 updates progress information 152 from time to time to indicate the current progress of playing content 410 on device 120. In one embodiment, device 120 updates progress information 152 according to instruction received from user 100.

In one embodiment, device 110 updates progress information 151 or device 120 updates progress information 152 periodically every 3 minutes, every 10 seconds, every hour, or according to a configurable period set by a user. In one embodiment, device 110 updates progress information 151 or device 120 updates progress information 152 according to instructions received from user 100.

In the various embodiment of the present invention, the progress information 151 of playing content 410 for user 100 is associated with the content 410 and the device 110, where the progress information 151 provides the current state of the playing of content 410 specifically on device 110. Similarly, progress information 152 of playing content 410 for user 100 is associated with device 120, where the progress information 152 provides the current state of the playing of the content 410 specifically on device 120. The progress information 151 associated with device 110 may be shared with device 120. Device 120 may then create its own progress information 152 based on progress information 151, as described further below.

Figure 4:
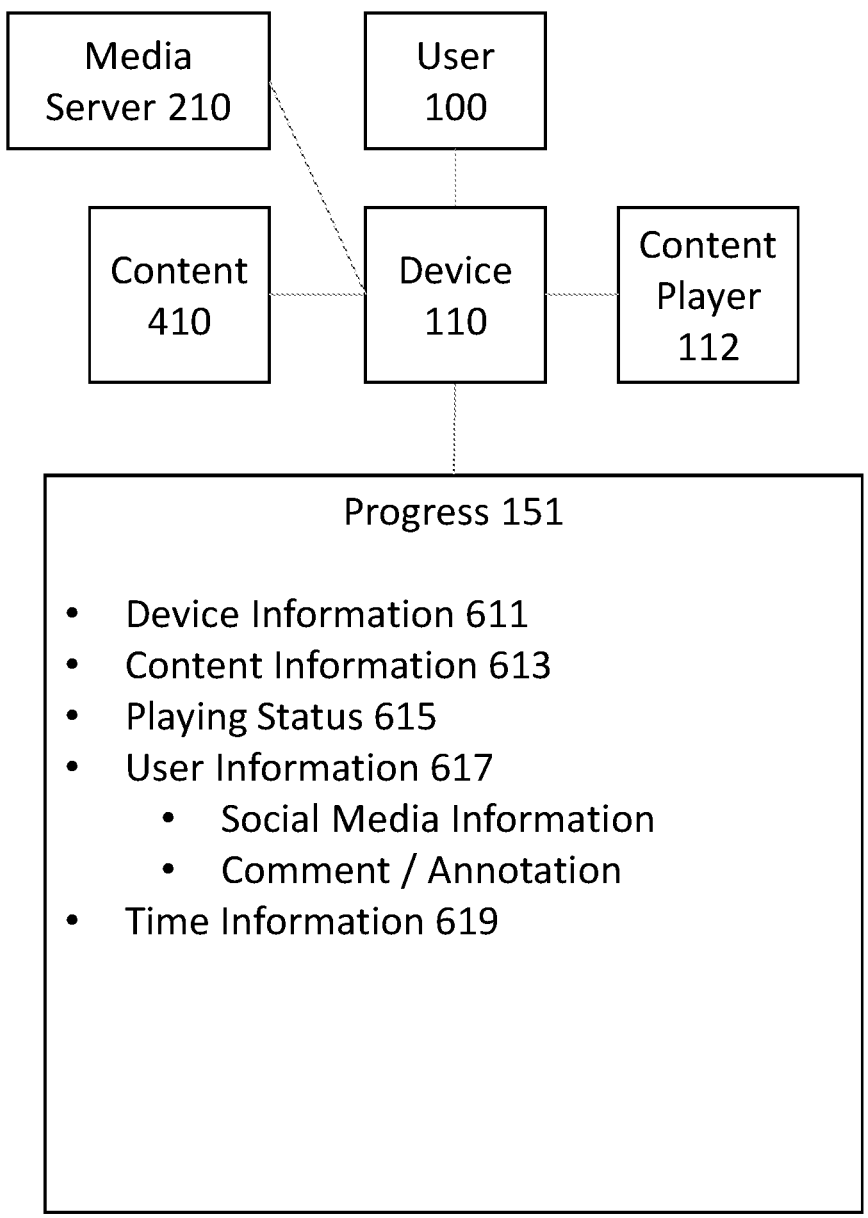
FIG. 4 illustrates a device creating progress information for the playing of a media content according to embodiments of the present invention.

FIG. 4 illustrates progress information 151 for content 410 according to embodiments of the present invention. In one embodiment, progress information 151 includes device information 611 of device 110. Device information 611 may include: an identity of device 110; user information stored in device 110; functional information including information for the various modules of device 110 illustrated in FIG. 2a; information regarding stored executable instructions of device 110; and other common device information.

In one embodiment, progress information 151 includes content information 613 of content 410. Content information 613 may include: an identity of content 410; access information of content 410 indicating how to retrieve content 410, such as information regarding media server 210; attributes of content 410 in order to play content 410; and other information about content 410 such as content type, format, duration, size, indices, table of content, author, publication information, revision information, certification management information, DRM information, billing, and subscription.

In one embodiment, progress information 151 includes playing status 615 of content player 112. In one embodiment, playing status 615 includes a status of content player 112 playing content 410. Playing status 615 may include one or more previous status of playing content 410. In one embodiment, the status of playing content 410 includes content type related status, for example page number, paragraph, column number, line number, word sequence, bookmark, page mark, percentage, chapter number, track number, album information, time marker, time, a duration of time, audio volume information, display resolution, resolution of video content, resolution of presentation, slide number, picture number, image number, document index, location in a document, and other necessary information that captures information of content player 112 while playing content 410. Playing status 615 may depend on the content type of content 410. In embodiment, if content 410 includes a video, an audio clip, a song, a piece of music, a book, a document, a picture, an album, a slide, a diagram, a spreadsheet, an animation, or a combination of the above, playing status 615 includes status for playing a video, an audio clip, a song, a piece of music, a book, a document, a picture, an album, and so forth.

In one embodiment, progress information 151 includes user information 617 about user 100. In one embodiment, user information 617 includes a user identity, a subscription identity, a machine identity, a user profile, and one or more activities of user 100 while consuming content 410. In one embodiment, user information 617 indicates one or more aspects of user experiences. In one embodiment, user information 617 includes a user expression, an annotation, a user comment, a user bookmark, a highlight, a marking on the content, an audio recording, a timestamp, a revision, or any information relating to a user activity while consuming content 410. In one embodiment, user information 617 includes social media information related to user 100 or to content 410. In one embodiment, social media information of user information 617 includes annotation or comment of content 410 from friends of user 100 or other users who are consuming content 410 simultaneously or had consumed content 410 previously. In one embodiment, device 110 obtains the social media information of user information 617 from data network 500.

In one embodiment, progress information 151 includes time information 619 indicating validity of progress information 151. In one embodiment, time information 619 includes a current time, a current time of day, or a current date. In one embodiment, time information 619 includes an expiration time, an expiration date, a validity time, a validity date, a duration of time, or an expiration or validity condition. In one embodiment, content player 112 uses the time information 619 to determine if progress information 151 is valid, such as by comparing the time information 619 with a clock 128. In one embodiment, an expiration time or date or a validity time or date indicates 60 minutes, morning, evening, within 24 hour, by end of the day, by end of the week, by end of the month, before 5 pm, or a reasonable time or date expected for the content. In one embodiment, an expiration or validity condition includes a geographic location, such as: valid within the building; not valid outside Bay Area; expired outside the shop; or expired after 2 hours and outside the theme park. In one embodiment, an expiration or validity condition includes: not valid for television set; not valid for WiFi network; valid only for cellular network; expires after 15 minutes for a $3^{rd}$ party e-reader; expires after 30 minutes if device is not in the same network; or a condition relating to the device using progress information 151. In one embodiment, user 100 specifies to device 110 the expiration or the validity condition. In one embodiment, device 110 obtains the validity condition or the expiration from media server 210.

Figure 5:
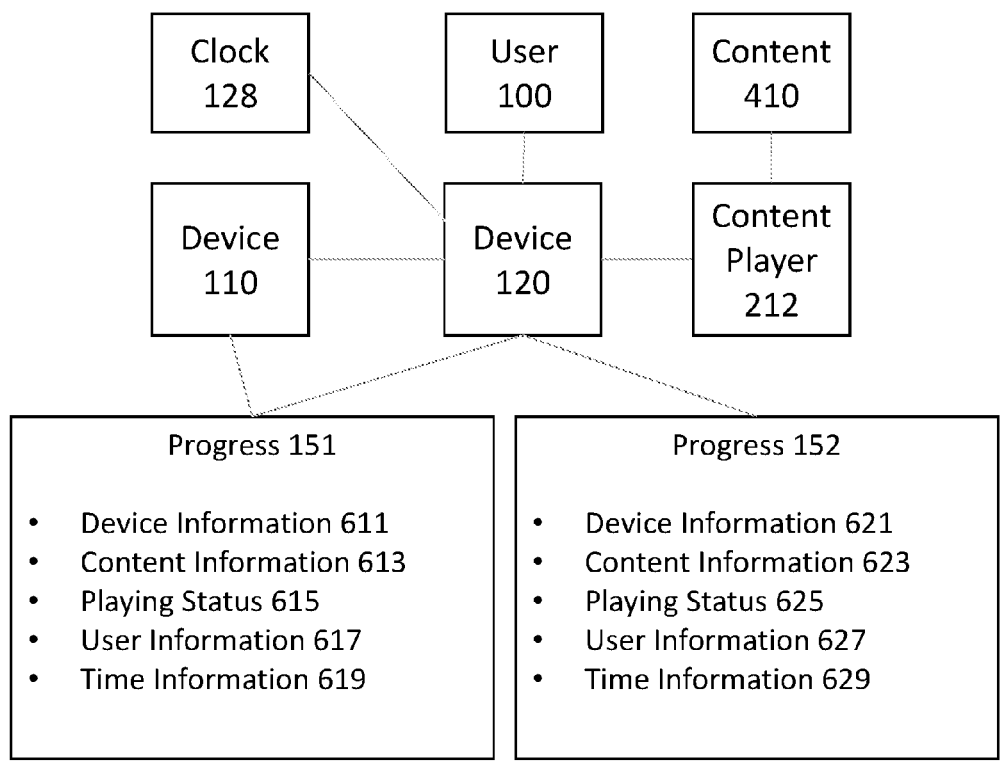
FIG. 5 illustrates resuming the playing of a media content on a second device according to embodiments of the present invention.

FIG. 5 illustrates an embodiment to resume playing content 410 on device 120. In one embodiment, device 120 includes content player 122. Device 120 obtains progress information 151 from device 110 as illustrated in FIG. 1.

In one embodiment, device 120 creates progress information 152 based on progress information 151. In one embodiment, device 120 places device information 621 of device 120 into progress information 152. In one embodiment, device 120 copies a portion of device information 611 of progress information 151 into device information 621 of progress information 152.

In one embodiment, device 120 creates content information 623 based on content 410, content information 613 of progress information 151 and device information 621. In one embodiment, device 120 copies content information 613 into content information 623. In one embodiment, device 120 replaces some data in content information 623, such as access information of content 410 and attributes of content 410. In one embodiment, device 120 determines content 410 can be accessed or can be better accessed from a media server different from the media server used by device 110, device 120 changes access information of content 410 in progress information 152. In one embodiment, device 120 determines attributes of content 410 such as billing, format, edition, publication dates being different from the attributes of content 410 in progress information 151. In response, device 120 changes the attributes of content 410 in progress information 152.

In one embodiment, device 120 copies playing status 615 of progress information 151 as playing status 625 of progress information 152. In one embodiment, device 120 changes playing status 625. In one embodiment, device 120 changes a resolution, a bookmark, an audio volume setting, a time, a duration of time, or any other information in playing status 625 as appropriate to provide a good user experience for playing content 410 for user 100. For example, in one embodiment, device 120 has a higher resolution display and changes a resolution in playing status 615 to a higher resolution. In one embodiment, device 120 has a lower resolution display and changes a resolution in playing status 615 to a lower resolution in playing status 625. In one embodiment, some attributes of content 410 obtained by device 120 is different from attributes of content 410 obtained by device 110. In response, device 120 changes one or more attributes of content 410, such as: a time; a duration of time; a percentage; a page number; or any information in progress information 151 according to the difference between the two different versions of content 410. In one embodiment, device 120 changes a location in progress 615 to a different location to be stored in playing status 625 so that device 120 resumes playing content 410 from the different location. In one embodiment, device 120 calculates the location stored in progress information 152 based on the location in progress information 151. In one embodiment, device 120 calculates the location in progress information 152 to be a location prior to or earlier to the location in progress information 151. In one embodiment, the location in progress information 152 is 5 seconds, 1 minute earlier than the location in progress information 151. In one embodiment, the location in progress information 152 is a paragraph, a page, a slide, or 1% prior to the location in progress information 151. In one embodiment, the location in progress information 152 is at the beginning of a paragraph, a page, a slide, a video clip, an animation, an audio clip, a song, a track, a document, an image, or an album according to the location in progress information 151. In one embodiment, device 120 changes the audio volume information of progress information 151 when storing into progress information 152.

In one embodiment, device 120 copies user information 617 of progress information 151 into user information 627 of progress information 152. In one embodiment, device 120 modifies user information 627 according to information stored in device 120. In one embodiment, device 120 inserts additional social media information related to user 100 found in device 120 but not in user information 617. In one embodiment, device 120 removes some data from user information 627. In one embodiment, user 100 does not have a user account or is not recognized by device 120, device 120 removes user information data directly related to user 100 from user information 627, so as to protect the privacy of user 100. In one embodiment, device 120 detects user 100 is not found in device 120. Device 120 asks if user 100 wants to create a user account on device 120. Upon affirmative response from user 100, device 120 creates a user account for user 100 and retains data relating to user 100 in user information 627. In one embodiment, device 120 automatically creates a user account for user 100. In one embodiment, device 120 notifies user 100 of the created user account. In one embodiment, device 120 modifies user information 627 corresponding to the user account information of user 100 in device 120.

In one embodiment, device 120 examines time information 619 of progress information 151 to determine the validity of progress information 151. In one embodiment, device 120 compares time information 619 and a current time of a clock 128 available to device 120. In one embodiment, device 120 determines that time information 619 indicates that progress information 151 has expired when compared to the current time. In response, device 120 does not use progress information 151 to create progress information 152. In one embodiment, device 120 determines that the time information 619 indicates that progress information 151 is valid. In one embodiment, device 120 compared time information 619 to the current time. In one embodiment, device 120 uses information about device 120 to compare to time information 619. In response, device 120 uses progress information 151 in creating progress information 152. In one embodiment, device 120 copies time information 619 as time information 629 of progress information 152. In one embodiment, device 120 changes some data in time information 629, such as a time duration, a time, a date, an expiration time, or an expiration or validity condition, to reflect the current time or device 120 condition. In one embodiment, device 120 changes time information 627 after obtaining additional information from a media server serving content 410. In one embodiment, device 120 changes time information 629 after interacting with user 100.

In one embodiment, device 120 compares time information 629 of progress information 152 to the current time to determine if progress information 152 is valid prior to using progress information 152 to play content 410 or modifying progress information 152. In one embodiment, while content player 212 is playing content 410, device 120 determines time information 629 is invalid. Content player 212 stops playing content 410. In one embodiment, device 120 then informs user 100 that progress information 152 is invalid.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for playing media content among a plurality of devices by a group of users, the group of users comprising at least a first user and a second user, comprising:
   (a) receiving, by a second device, an instruction from the second user to play a second copy of the media content on the second device;
   (b) in response to receiving the instruction, obtaining, by the second device, a first progress information associated with a first device of the first user, the first progress information comprising a current progress in a playing of a first copy of the media content by the first device;
   (c) creating, by the second device, a second progress information associated with the second copy of the media content and the second device based on the first progress information;
   (d) fetching, by the second device, the second copy of the media content based on the second progress information;

(e) simultaneously playing the first copy of the media content by the first device using the first progress information and playing the second copy of the media content by the second device using the second progress information; and (f) simultaneously and separately updating the first progress information by the first device based on the playing of the first copy of the media content by the first device and updating the second progress information by the second device based on the playing of the second copy of the media content by the second device.

2. The method of claim 1, further comprising:

(g) receiving the updated first progress information by the second device and receiving the updated second progress information by the first device;

(h) further updating the updated first progress information by the first device based on the updated second progress information and further updating the second progress information by the second device based on the updated first progress information.

3. The method of claim 1, wherein the updating (f) comprises:

(f1) receiving a first user comment from the first user by the second device; and (f2) updating the second progress information by the second device by inserting the first user comment into the second progress information.

4. The method of claim 3, wherein the updating (f) further comprises:

(f3) receiving a second user comment from the second user by the first device; and (f4) updating the first progress information by the first device by inserting the second user comment into the first progress information.

5. The method of claim 1, wherein the updating (f) comprises:

(f1) sending, by the first device, the updated first progress information to a network computer;

(f2) receiving, by the second device, the updated first progress information from the network computer; and (f3) simultaneously and separately from the updating of the first progress information, updating the second progress information by the second device based on the updated first progress information received from the network computer.

6. The method of claim 1, wherein the obtaining (b) comprises:

(b1) discovering the first device by the second device through a computer device over a data network; and (b2) after discovering the first device, obtaining the first progress information from the first device through the computer device by the second device.

7. The method of claim 6, wherein the discovering (b1) comprises:

(b1i) sending a discovery message to the computer device by the second device; and (b1ii) receiving a response to the discovery message by the second device.

8. The method of claim 6, wherein the obtaining (b) further comprises:

(b3) obtaining, by the second device from the computer device, the first program information, the first progress information further comprising content information associated with the media content.

9. A non-transitory computer readable medium comprising computer readable program code embodied therein for playing media content among a plurality of devices by a group of users, the group of users comprising at least a first user and a second user, wherein when executed by a processor causes the processor to:

(a) receive, by a second device, an instruction from the second user to play a second copy of the media content on the second device;

(b) in response to receiving the instruction, obtain, by the second device, a first progress information associated with a first device of the first user, the first progress information comprising a current progress in a playing of a first copy of the media content by the first device;

(c) create, by the second device, a second progress information associated with the second copy of the media content and the second device based on the first progress information;

(d) fetch, by the second device, the second copy of the media content based on the second progress information;

(e) simultaneously play the first copy of the media content by the first device using the first progress information and play the second copy of the media content by the second device using the second progress information; and (f) simultaneously and separately update the first progress information by the first device based on the playing of the first copy of the media content by the first device and update the second progress information by the second device based on the playing of the second copy of the media content by the second device.

10. The medium of claim 9, wherein when executed by the processor causes the processor to further:

(g) receive the updated first progress information by the second device and receiving the updated second progress information by the first device;

(h) further update the updated first progress information by the first device based on the updated second progress information and further update the second progress information by the second device based on the updated first progress information.

11. The medium of claim 9, wherein the computer readable program code to update (f), when executed by the processor, causes the processor to further:

(f1) receive a first user comment from the first user by the second device; and (f2) update the second progress information by the second device by inserting the first user comment into the second progress information.

12. The medium of claim 11, wherein the computer readable program code to update (f), when executed by the processor, causes the processor to further:

(f3) receive a second user comment from the second user by the first device; and (f4) update the first progress information by the first device by inserting the second user comment into the first progress information.

13. The medium of claim 9, wherein the computer readable program code to update (f), when executed by the processor, causes the processor to:

(f1) send, by the first device, the updated first progress information to a network computer;

(f2) receive, by the second device, the updated first progress information from the network computer; and (f3) simultaneously and separately from the update of the first progress information, update the second progress information by the second device based on the updated first progress information received from the network computer.

14. The medium of claim 9, wherein the computer readable program code to obtain (b), when executed by the processor, causes the processor to:
- (b1) discover the first device by the second device through a computer device over a data network; and
- (b2) after discovering the first device, obtain the first progress information from the first device through the computer device by the second device.

15. The medium of claim 14, wherein the computer readable program code to discover (b1), when executed by the processor, causes the processor to:
- (b1i) send a discovery message to the computer device by the second device; and
- (b1ii) receive a response to the discovery message by the second device.

16. The medium of claim 14, wherein the computer readable program code to obtain (b), when executed by the processor, causes the processor to:
- (b3) obtain, by the second device from the computer device, the first program information, the first progress information further comprising content information associated with the media content.

17. A system for playing media content among a plurality of devices by a group of users, the group of users comprising at least a first user and a second user, comprising:
- a first device for creating a first progress information associated with a media content and the first device, the first progress information comprising a current progress in a playing of the media content by the first device; and
- a second device for:
- (a) receiving an instruction from the second user to play a second copy of the media content on the second device;
- (b) in response to receiving the instruction, obtaining the first progress information associated with the first device of the first user;
- (c) creating a second progress information associated with the second copy of the media content and the second device based on the first progress information;
- (d) fetching the second copy of the media content based on the second progress information;
- (e) simultaneously playing the first copy of the media content by the first device using the first progress information and playing the second copy of the media content by the second device using the second progress information; and
- (f) simultaneously and separately updating the first progress information by the first device based on the playing of the first copy of the media content by the first device and updating the second progress information by the second device based on the playing of the second copy of the media content by the second device.

18. The system of claim 17, further comprising:
- (g) receiving the updated first progress information by the second device and receiving the updated second progress information by the first device;
- (h) further updating the updated first progress information by the first device based on the updated second progress information and further updating the second progress information by the second device based on the updated first progress information.

19. The system of claim 17, wherein the updating (f) comprises:
- (f1) receiving a first user comment from the first user by the second device; and
- (f2) updating the second progress information by the second device by inserting the first user comment into the second progress information.

20. The system of claim 19, wherein the updating (f) further comprises:
- (f3) receiving a second user comment from the second user by the first device; and
- (f4) updating the first progress information by the first device by inserting the second user comment into the first progress information.

21. The system of claim 17, wherein the updating (f) comprises:
- (f1) sending, by the first device, the updated first progress information to a network computer;
- (f2) receiving, by the second device, the updated first progress information from the network computer; and
- (f3) simultaneously and separately from the updating of the first progress information, updating the second progress information by the second device based on the updated first progress information received from the network computer.

22. The system of claim 17, wherein the obtaining (b) comprises:
- (b1) discovering the first device by the second device through a computer device over a data network; and
- (b2) after discovering the first device, obtaining the first progress information from the first device through the computer device by the second device.

23. The system of claim 22, wherein the discovering (b1) comprises:
- (b1i) sending a discovery message to the computer device by the second device; and
- (b1ii) receiving a response to the discovery message by the second device.

24. The system of claim 22, wherein the obtaining (b) further comprises:
- (b3) obtaining, by the second device from the computer device, the first program information, the first progress information further comprising content information associated with the media content.

\* \* \* \* \*